(12) United States Patent
Hoagland

(10) Patent No.: US 6,273,459 B1
(45) Date of Patent: *Aug. 14, 2001

(54) INSTRUMENT PANEL SAFETY DEVICE FOR MOTOR VEHICLE

(75) Inventor: Larry D. Hoagland, Noblesville, IN (US)

(73) Assignee: Unique Technologies, L.C., Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/713,833

(22) Filed: Nov. 15, 2000

Related U.S. Application Data

(63) Continuation of application No. 09/114,010, filed on Jul. 10, 1998, now abandoned, which is a continuation-in-part of application No. 08/654,905, filed on May 22, 1996, now Pat. No. 5,893,580

(60) Provisional application No. 60/052,148, filed on Jul. 10, 1997.

(51) Int. Cl.[7] .................................................. B60R 21/22
(52) U.S. Cl. ......................................... 280/732; 280/731
(58) Field of Search ................................. 280/731, 728.1, 280/730.1, 732, 737, 777

(56) References Cited

U.S. PATENT DOCUMENTS

| | | | |
|---|---|---|---|
| 5,623,756 | * | 4/1997 | Yanagidate et al. ................... 29/525 |
| 5,640,884 | * | 6/1997 | Fujiu et al. ............................. 74/492 |
| 5,791,686 | * | 8/1998 | Moriyama ............................. 280/777 |
| 5,826,901 | * | 10/1998 | Adomeit ............................. 280/728.2 |
| 5,893,580 | * | 4/1999 | Hoagland et al. ................... 280/731 |
| 6,170,862 | * | 1/2001 | Hoagland et al. ................... 280/731 |

* cited by examiner

Primary Examiner—Paul N. Dickson
Assistant Examiner—Tony Winner
(74) Attorney, Agent, or Firm—Woodard, Emhardt, Naughton Moriarty & McNett

(57) ABSTRACT

A collapsible instrument panel and air bag combination for a motor vehicle has an elongated hollow cylinder slidably mounted on a piston. The space between the interior wall of the cylinder and the piston is sealed in a gas-tight fashion. A valve is attached to the top of the cylinder, and the instrument panel is connected to the valve so that the cylinder, valve, and instrument panel move axially as a single unit relative to the piston. The valve has a frangible seal hermetically secured inside it so that the top of the piston, the interior wall of the cylinder and the seal define an air-tight cavity. Prior to collision, the cavity is under pressure such that the cylinder and thus, the instrument panel is supported by a column of pressurized gas. A coil spring inside the cylinder urges the piston and the bottom of the cylinder apart. The seal has a bore with an explosive compound in it. Lead lines connect the explosive compound with an electronic collision sensor. When a collision occurs, the sensor sends an electronic signal that ignites the explosive compound and fractures the seal permitting the gas to escape from the cavity causing collapse of the cylinder and the instrument panel. An air bag stowed in the instrument panel may be connected to the top of the valve to capture the air released from the cavity providing additional protection to the occupant.

19 Claims, 7 Drawing Sheets

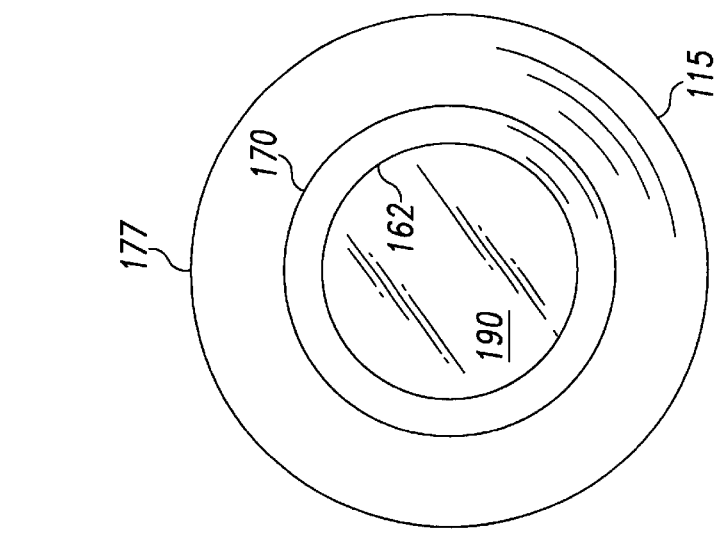
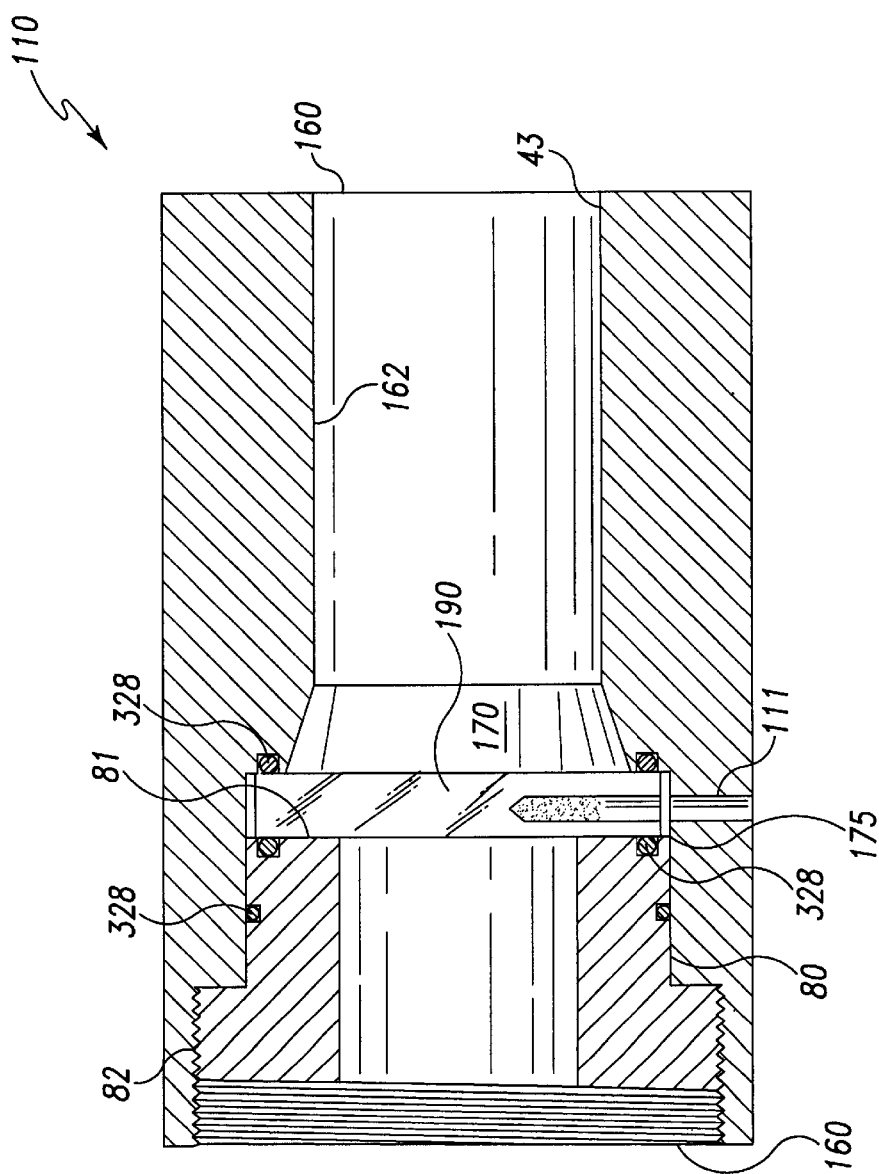
Fig. 7
Fig. 8

INSTRUMENT PANEL SAFETY DEVICE FOR MOTOR VEHICLE

REFERENCE TO RELATED APPLICATIONS

This application is a continuation of U.S. patent application Ser. No. 09/114,010, filed Jul. 10, 1998 now abandoned, which is a continuation-in-part of U.S. patent application Ser. No. 08/654,905, filed May 22, 1996, now U.S. Pat. No. 5,893,580.

This application claims benefit of provisional application 60/052,148, filed Jul. 10, 1997.

FIELD OF THE INVENTION

The present invention relates to the field of automobile occupant safety devices, and more particularly to an instrument panel safety device.

BACKGROUND OF THE INVENTION

While air bags have proven to increase the overall survival rate of average-sized, properly restrained occupants, others are being injured or killed by air bags because the devices that inflate air bags are too powerful. Upon deployment, the bags "punch" occupants at speeds of up to 200 miles per hour, and because small stature individuals, children and babies in car seats are usually closer to the instrument panel at the time the air bag is deploying, they are suffering severe injury and death as a result.

Air bags are typically mounted within the instrument panel and concealed by a hard plastic cover that is ejected when the bag explodes out of its stowed position. Additionally, air bags are constructed so as to include a tough abrasive liner. The liner is necessary to maintain the bag's integrity during inflation because tremendous force and heat are generated by present inflators. Statistics maintained by the National Highway Traffic Safety Administration (NHTSA) show that unrestrained and improperly restrained individuals are also suffering injury, because their momentum during preimpact braking also places them close to the air bag when it deploys. Therefore, small stature individuals, children, infants and unrestrained or improperly restrained individuals, are all especially vulnerable to injury or death as a result of current air bag designs. This is unacceptable.

Air bag deactivation and manual cutoff switches for passenger side air bags are two interim solutions NHTSA and the Congress have considered. The problem, however, requires a permanent solution.

Therefore, it is highly desirable to provide a new instrument panel safety device.

It is also highly desirable to provide a new instrument panel safety device that collapses the instrument panel away from the occupant during deployment of the air bag.

It is also highly desirable to provide a new instrument panel safety device that is capable of inflating an air bag without generating tremendous force and heat like present air bag inflators.

It is also highly desirable to provide a new instrument panel safety device that operates in conjunction with any type of existing inflator.

It is finally highly desirable to provide a new instrument panel safety device that meets all of the above desired features.

SUMMARY

It is an object of the invention to provide a new instrument panel safety device.

It is also an object of the invention to provide a new instrument panel safety device that collapses the instrument panel away from the occupant during deployment of the air bag.

It is also an object of the invention to provide a new instrument panel safety device that is capable of inflating an air bag without generating tremendous force and heat like present air bag inflators.

It is also an object of the invention to provide a new instrument panel safety device that operates in conjunction with any type of existing inflator.

It is finally an object of the invention to provide a new instrument panel safety device that meets all of the above desired features.

In the broader aspects of the invention there is provided an instrument panel safety device and valve head combination for use in a motor vehicle that has a collision sensing means for sensing a collision operably mounted on the vehicle. The device has a hollow cylinder with a top end and a bottom end. The top end is adapted to be connected to the instrument panel. A piston resides within the cylinder. The hollow cylinder is axially slidable on the piston between an extended position and a collapsed position. An elongated rod with one end secured to the piston and its other end connected to the vehicle is provided. The piston and the rod are substantially immovable relative to the hollow cylinder. Sealing means for sealing the hollow cylinder is provided in order to define an air-tight cavity within the hollow cylinder. The air-tight cavity contains pressurized gas prior to collision. Opening means to rapidly open the sealing means is provided. A signal generated by the collision sensing means actuates the opening means, thereby permitting movement of the hollow cylinder from the extended position to the collapsed position. An air bag for capturing the pressurized gas released from the cavity is positioned within the instrument panel.

DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 7 is a side cross-section on the line 7—7 of FIG. 3 in the direction of the arrows showing the head of the safety device.

FIG. 8 is a bottom view of an embodiment of the head of the safety device.

DESCRIPTION

Figure 1:
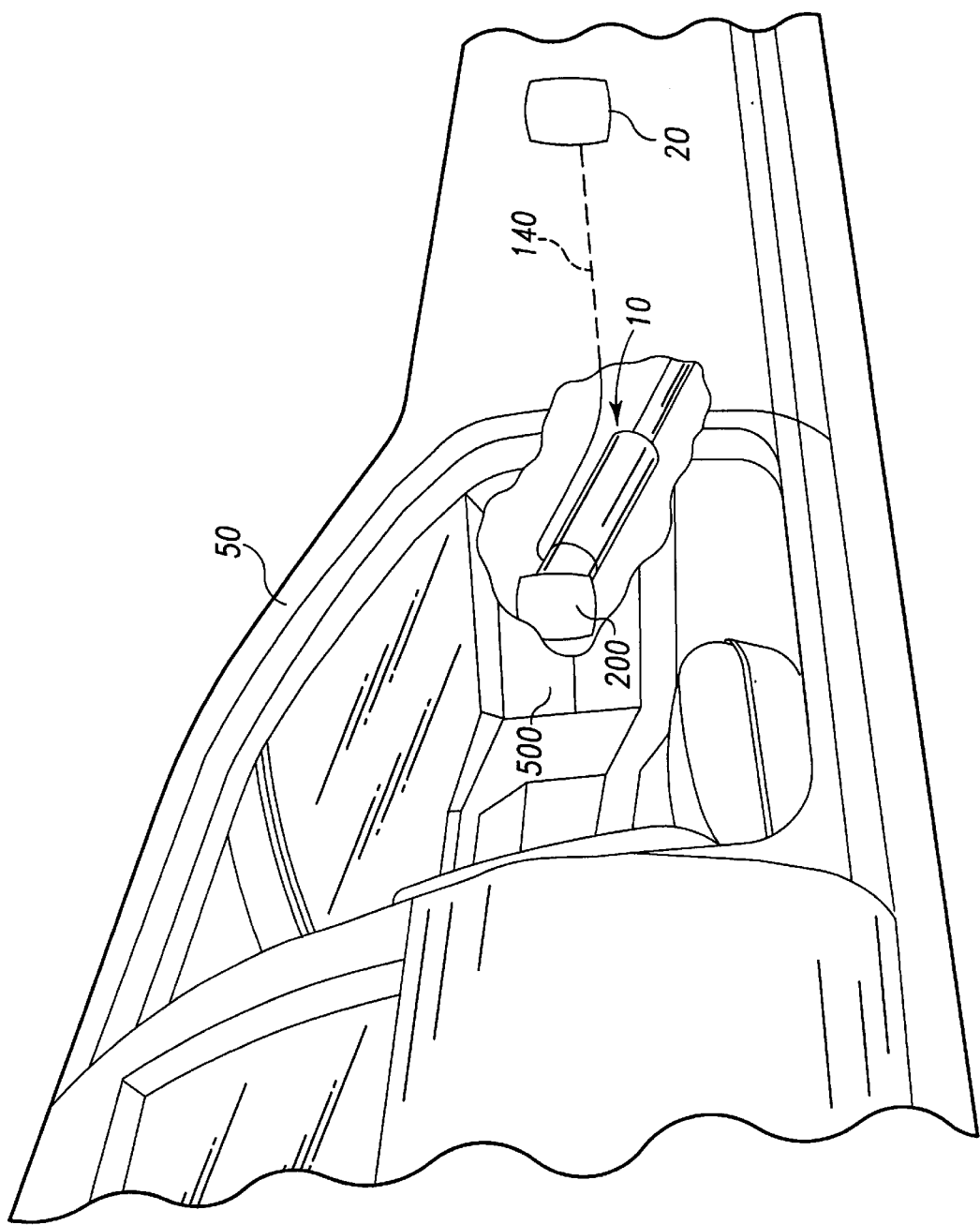
FIG. 1 is a cutaway perspective view of a motor vehicle and instrument panel showing the safety device of the invention in the extended position.
Figure 2:
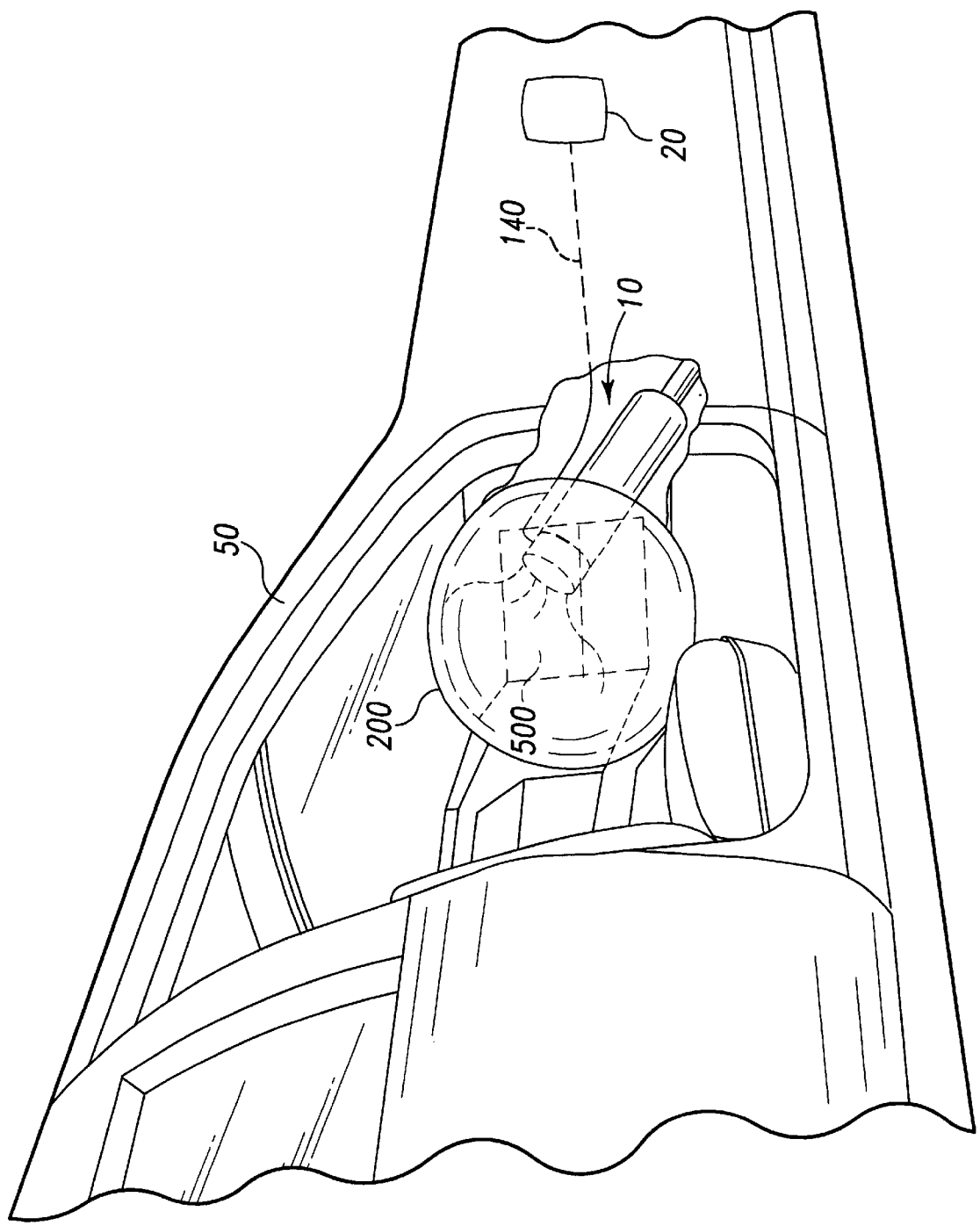
FIG. 2 is a cutaway view like FIG. 1 showing the safety device of the invention in the collapsed position with the air bag deployed.

FIG. 1 shows the instrument panel safety device 10 installed in motor vehicle 50. In FIG. 1, safety device 10 is in the extended position, and FIG. 2 shows the device in the collapsed position. In that embodiment, collision sensing means 20, which is shown diagrammatically in the Figures, is connected to safety device 10 by wire 140. Sensing means 20 is usually located in the front of vehicle 50 and has a microprocessor which produces the electronic signal for actuating safety device 10.

Figure 3:
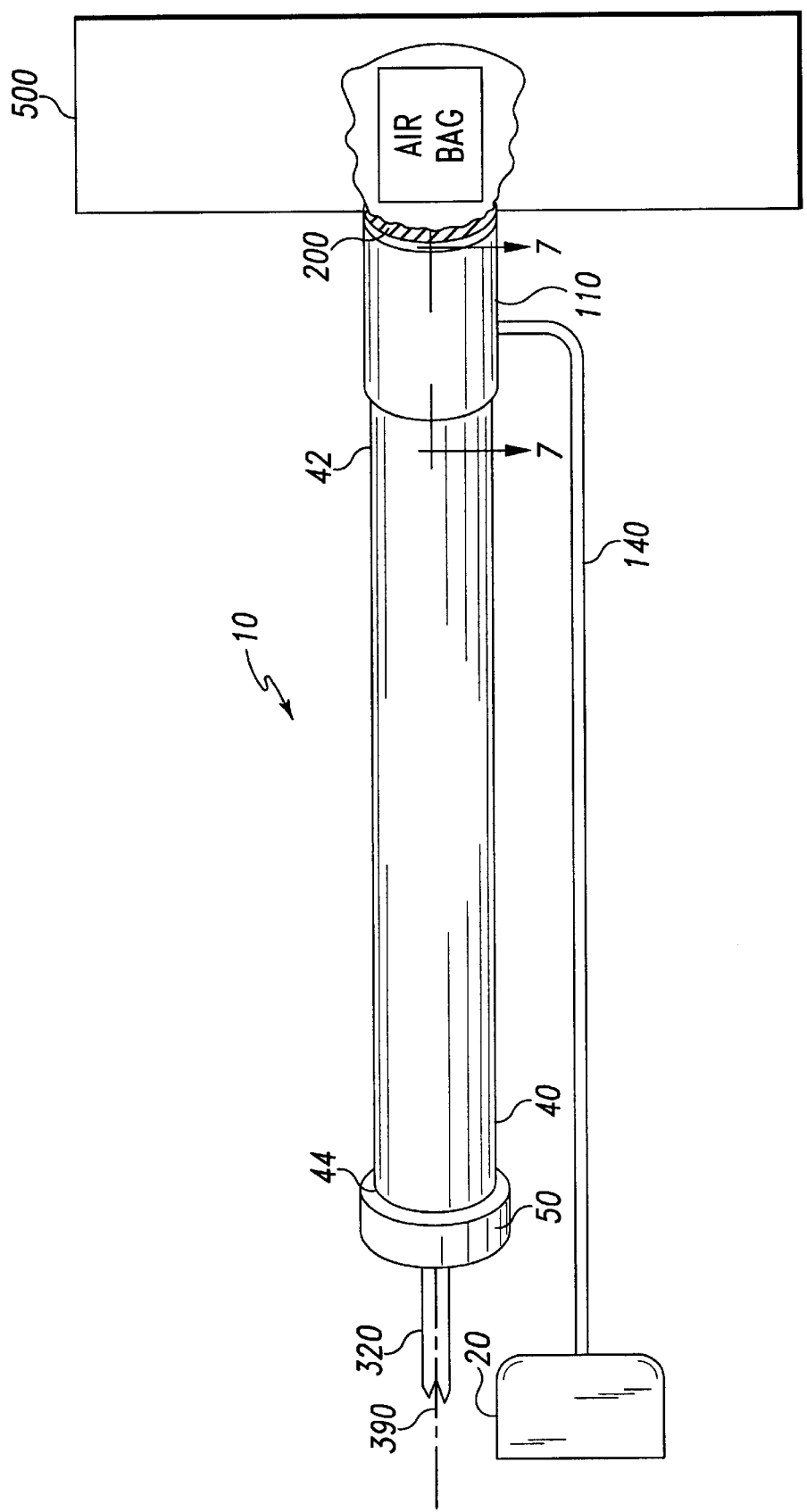
FIG. 3 is a side perspective view of an embodiment of the instrument panel safety device of the invention. The instrument panel is shown diagramatically.

Referring now to FIG. 3, safety device 10 includes hollow cylinder 40, valve head 110, cap 50, and axial rod 320. Cylinder 40, head 110, cap 50, and axial rod 320 are generally axially aligned along axis 390 and formed from machinable metal, such as brass, stainless steel or steel alloy or aluminum as desired. Cylinder 40, head 110 and cap 50 may be insulated by known means or formed from an insulating material which is rigid and capable of containing elevated gas pressures of about 600 to 1,000 p.s.i. Head 110 is secured to top 42 of cylinder 40, and cap 50 is secured to bottom 44 of cylinder 40 by known means, such as threads 82. The top of cylinder 40 and head 110 are secured together in a gas-tight fashion. Pressurized gas from atmospheric pressure to elevated pressures is contained in hollow cylinder 40.

Figure 12:
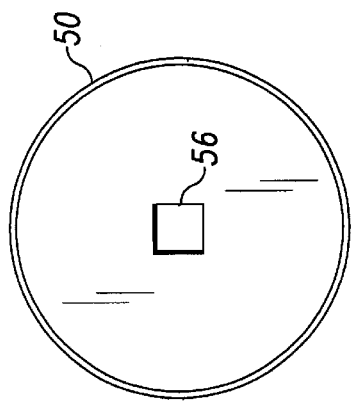
FIG. 12 is a bottom view of an embodiment of the cap.

The top of head 110 is adapted for securing to the instrument panel 500 using means known by skilled artisans. Cap 50 has bore 56 extending therethrough, as shown in FIG. 12, for receiving rod 320. Telerances of bore 56 and axial rod 320 are such as to accommodate axial movement of cap 50 with cylinder 40 and head 110 as a single unit along rod 320 between the extended and collapsed positions.

Figure 4:
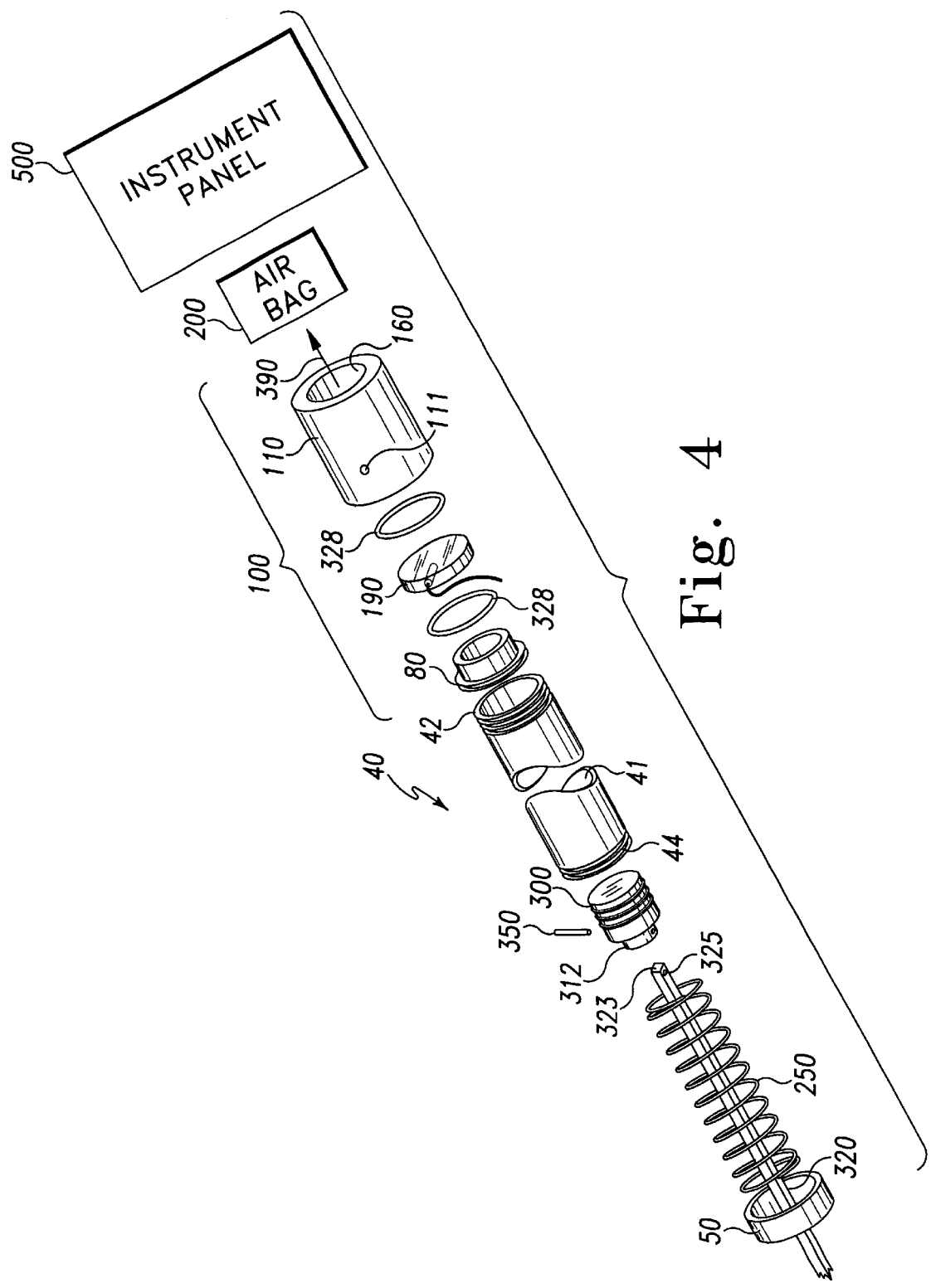
FIG. 4 is a side elevational perspective view of an embodiment of the instrument panel safety device of the invention shown disassembled. The air bag and instrument panel are shown diagramatically.
Figure 5:
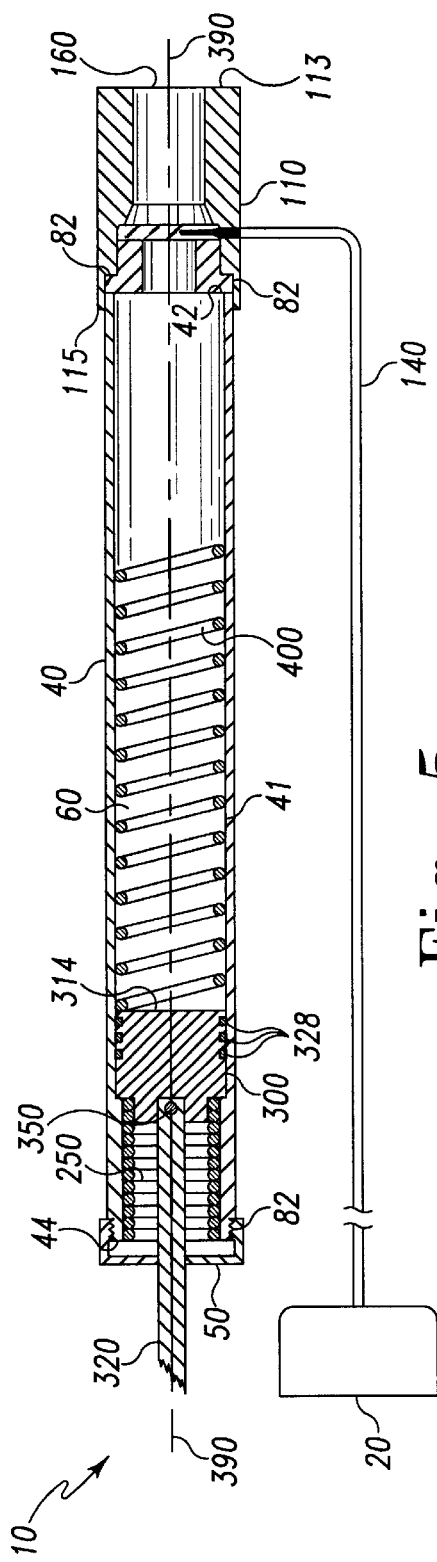
FIG. 5 is a side cross-sectional view of the safety device shown in the extended position.

Inside hollow cylinder 40 is air-tight cavity 60 for containing pressurized gas, piston 300, and biasing means, such as coil spring 250 for biasing piston 300 and cap 50 apart. Another coil spring 400 may also be positioned in cylinder 40, as shown in FIGS. 4 and 5, in order to provide a means for damping force placed on cylinder 40 by an occupant upon collision. Coil springs 250, 400 are formed from metal and have specific gauges depending upon the result desired. A coil spring having a spring constant (K) of between about 80 lbs/in and about 320 lbs/in has proven effective for biasing means 250, and a coil spring having a spring constant (K) of between about 40 lb/in and 160 lb/in has proven effective for damping means 400.

Figure 10:
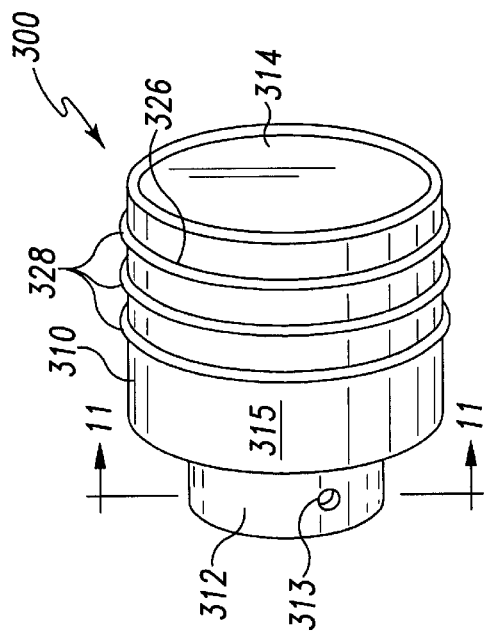
FIG. 10 is an elevated side perspective view showing an embodiment of the piston.
Figure 11:
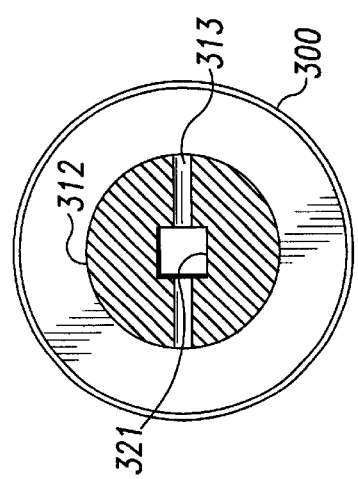
FIG. 11 is a bottom cross-section on the line 11—11 of FIG. 10 in the direction of the arrows showing the boss and piston.

Referring to FIGS. 10 and 11, piston 300 includes generally cylindrical solid is body 310 having boss 312 at one end and air cavity surface 314 at the other end. In the preferred embodiment, boss 312 is integrally formed with solid cylindrical body 310. Circumferential wall 315 joins boss 312 with air cavity surface 314. Boss 312 has rod seating bore 321 extending generally axially therein with pin hole 313 extending transversely through boss 312. One embodiment has at least one o-ring groove 326 formed therein where at least one o-ring 328 resides. O-ring(s) 328 engage the interior wall of cylinder 40 in a gas-tight fashion so that piston 300, interior wall 41 of cylinder 40 and head 110 define air cavity 60. Piston 300 is formed of machinable metal, such as brass or steel alloy, or aluminum, and, in the embodiment shown, axial rod 320 connects boss 312 via roll pin 350 to vehicle 50 so that piston 300 and rod 320 are substantially immovable relative to cylinder 40.

Referring now to FIGS. 4–9, top 42 of hollow cylinder 40 has outlet 41, and head 110 is coupled thereto in a gas-tight fashion. In that embodiment, cylinder 40 contains pressurized gas. It is entertained, however, that head 110 is well suited for use in connection with any pressurized fluid or gas container. Head 110 may be used in any vehicle having a collision sensing means connected thereto for producing a signal in response to a collision, where it is desirable to control the flow of pressurized fluid or gas from a container into an air bag connected inside a vehicle and deployed upon collision to protect an occupant from the flow of gas from the container into the occupant compartment. Thus, in an embodiment, air bag 200 may be connected to outlet 43 of head 110 and stowed in instrument panel 40, using means known in the art, so as to capture the pressurized gas released from air-tight cavity 60 and deploy concurrently with the collapse of instrument panel 500.

With particular reference to FIG. 7, valve head 110 includes o-rings 328, sealing means, or seal 190, and spacer member 80. Axial bore 160 extends through head 110 and includes bore wall 162 with entrance port 170, outlet 43 and seal housing 175 formed therein. Entrance port 170 is tapered with the larger end contiguous with seal 190. A generally transverse head bore 111 joins the exterior of head 110 and bore wall 162. Seal 190 is positioned within seal housing 175 and includes axial bore 160, as shown in FIG. 5. O-rings 328 contact opposite sides 186,188 of seal 190, and spacer member 80 abuts o-ring 328 contiguous with opposite side 186. Additional o-rings 328 may be positioned between bore wall 162 and spacer member 80 as desired to ensure seal 190 is air-tight.

Figure 9:
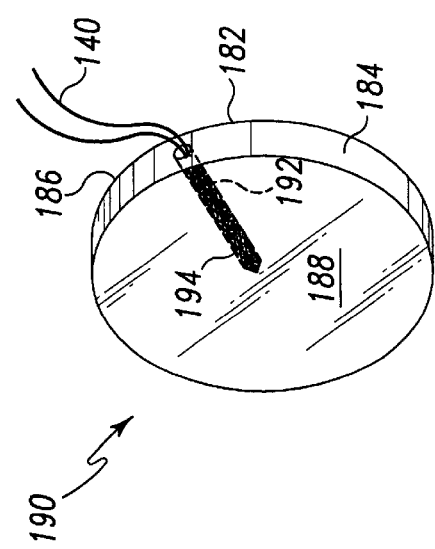
FIG. 9 is an elevated side perspective view showing an embodiment of the seal.

Referring now to FIGS. 7 and 9, seal 190 includes frangible disc-shaped body 182 having opposite sides 186, 188 and wall 184, which joins opposite sides 186,188. Disc-shaped body 182 may be formed from a number of glass composites and may have tempered and/or annealed portions as desired. One embodiment has opposite sides 186,188 formed from a sodium lime glass composition and wall 184 formed from tempered glass. Bore 192 extends transversely into wall 184 of seal 190. In that embodiment, tempered glass is well-suited for drilling bore 192 and resists shattering during manufacture. Explosive charge 194 resides in bore 192 and is formed from a mixture of pentaerythritol tetranitrate (PETN), lead azide, potassium perchlorate, and sulfur, for example. Explosive charge 194 requires an ignition temperature suitable for igniting by electrical means, such as a signal produced by collision sensing means 20. In an embodiment explosive charge 194 has an ignition temperature of about 300 degrees Fahrenheit.

Seal 190 is installed in seal housing 175 and rotated so that transverse bore 192 containing explosive charge 194 is aligned with head bore 111. Wires 140 are, thus, able to extend from transverse bore 192 through head bore 111 to the exterior of safety device 10 connecting explosive charge 194 to sensing means 20.

With reference to the embodiment shown in FIGS. 1 and 2, prior to collision, instrument panel 40 is in the extended position, as shown in FIG. 1. Valve head 110, which has seal 190 installed as above-described, threadedly engages top 42 of cylinder 40 and is sealed by known means, such as pipe dope or tape. Pressurized gas or fluid is pumped into cavity 60 using known valving apparatus, such as a Schrader valve for example, connecting the exterior and interior of cavity 60 (not shown). As the pressure inside cavity 60 is elevated, cylinder 40, head 110 and cap 50 all move forward axially as a single unit relative to piston 300 and axial rod 320, until reaching the extended position, as shown in FIGS. 1 and 4. Biasing means, such as coil spring 250, assumes a compressed condition. Damping means, such as coil spring 400 is for the most part generally relaxed in the extended position, the collapsed position and therebetween, but serves to absorb energy in more severe collisions when force is placed on the instrument panel by the occupant forcing the panel beyond the collapsed position.

Upon collision, sensing means 20 produces a signal, which is communicated through wire 140 to valve head 110. Wire 140 resides within head bore 111 and contacts explosive charge 194. Inside bore 192, magnesium wire or other reactive metal can be used for efficiently igniting explosive charge 194. The signal ignites charge 194 causing it to explode such that a breach is formed in body 182 of seal 190, thereby allowing rapid free flow of pressurized gas from air-tight cavity 60 into the occupant compartment or air bag-200 via entrance port 170 and axial bore 160. The amount and composition of explosive charge 194 determines the noise level and size of the breach formed in body 182. In an embodiment, a small explosive charge 194 is provided such that body 182 is only cracked or fragmented so that the rush of pressurized gas from air cavity 60 completes the destruction of seal 190. Seal 190 fragments into harmless dust-like particles, which are retained in the air bag or may be captured by any one of numerous filtering devices currently known in the art.

Figure 6:
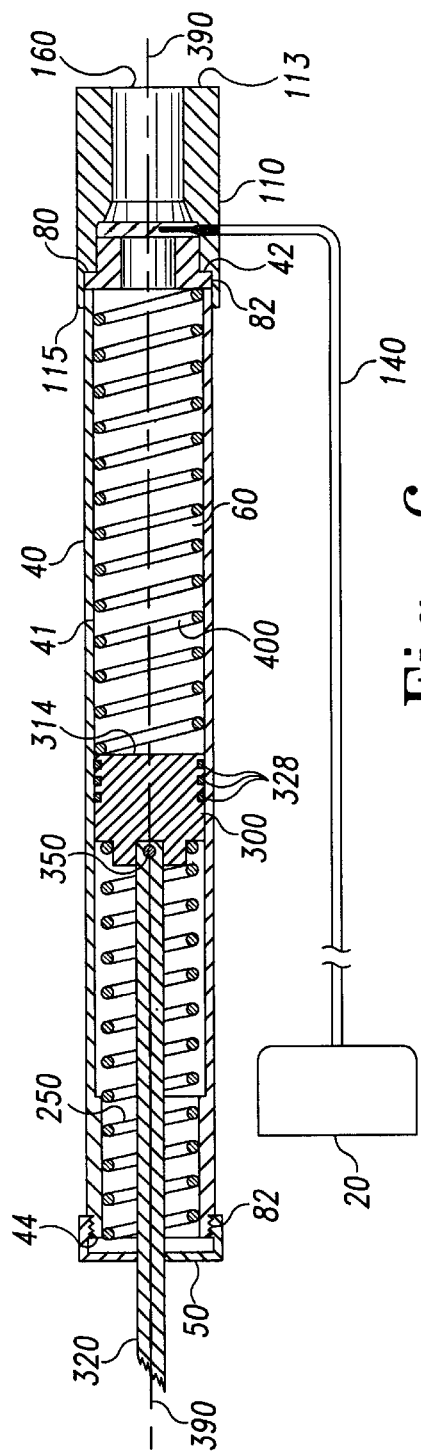
FIG. 6 is a side cross-sectional view like the view shown in FIG. 5 except the safety device is in the collapsed position.

Concurrently with the flow of gas out of cavity 60, biasing means, such as coil spring 250, rapidly assumes the relaxed position forcing cap 50 and boss 312 apart moving cylinder 40 axially rearwardly from the extended position to the collapsed position, which is shown in FIGS. 2 and 6. Air cavity 60 and head 110 are generally axially aligned such that the pressurized gas flows generally axially out of cavity 60. The collapsing action of cylinder 40 forces pressurized gas out of cavity 60 axially at a rate exceeding a free flow. In addition, entrance port 170 guides the pressurized gas into the shape of a whirling vortex maximizing the rate at which pressurized gas flows from the cavity 60 and into air bag 200. The rate of flow of the gas into the occupant compartment or air bag 200 far exceeds the rate of inflatable air bag systems to date without the use of toxic chemicals or chemicals which generate extreme heat and/or cold.

Collapsing safety device 10 makes the compartment interior larger upon impact and may operate concurrently with inflating an air bag. Thus, injuries to small stature individuals, infants and children are less likely upon low speed deployments of the air bag, since instrument panel 500 and thus, air bag 200 is collapsed away from the occupant upon deployment. Likewise, for the same reason, collapsible safety device 10 provides added protection to tall, tall-obese, and pregnant occupants.

Of course, in preimpact braking situations unrestrained and improperly restrained occupants have to approach air bag 200 instead of the air bag aggressively coming outward to them resulting in fewer incidents of injury and death to individuals and children.

While a specific embodiment of the invention has been shown and described herein for purposes of illustration, the protection afforded by any patent which may issue upon this application is not strictly limited to the disclosed embodiment, but extends to all structures and arrangements which fall fairly within the scope of the claims which are appended hereto.

What is claimed is:

1. An instrument panel safety device and valve head combination for use in a motor vehicle having a collision sensing means operably mounted on the vehicle and for sensing a collision, the device comprising:
   a hollow cylinder having a top end and a bottom end, said top end adapted to be connected to said instrument panel;
   a piston residing within said cylinder, said cylinder being axially slidable on the piston between an extended position and a collapsed position;
   an elongated rod with first and second ends, the first end secured to said piston and the second end connected to said vehicle such that the piston and the rod are substantially immovable relative to said vehicle;
   sealing means for sealing the hollow cylinder in order to define an air-tight cavity within the hollow cylinder, the air-tight cavity containing prior to collision pressurized gas; and
   opening means to rapidly open the sealing means in response to a signal generated by the collision sensing means, thereby permitting movement of the hollow cylinder from the extended position to the collapsed position.

2. The device of claim 1 wherein said sealing means comprises a head, an axial bore extending through the head, and a seal in the bore, wherein the head is secured to the top end of said hollow cylinder.

3. The device of claim 1 wherein a cap is secured to said bottom end of said hollow cylinder, said cap having a bore extending therethrough for receiving the rod such that the cylinder moves freely between said extended position and said collapsed position.

4. The device of claim 1 wherein an air bag for capturing said pressurized gas released from said cavity is positioned within said instrument panel.

5. The device of claim 1 wherein said seal further comprises a frangible body having a pair of opposite sides and a circumferential wall connecting said sides, a transverse bore for containing an explosive charge formed in the wall.

6. The device of claim 2 wherein said seal further comprises a frangible body having a pair of opposite sides and a circumferential wall connecting said sides, a transverse bore for containing an explosive charge formed in the wall.

7. The device of claim 3 further comprising biasing means inside said cylinder for biasing said piston and said cap apart.

8. The device of claim 5 wherein a generally transverse head bore is formed in said head for connecting the seal and the exterior of said head, and wires positioned in said head bore electrically connecting said explosive charge to said sensing means.

9. The device of claim 6 wherein a generally transverse head bore is formed in said head for connecting the seal and the exterior of said head, and wires positioned in said head bore electrically connecting said explosive charge to said sensing means.

10. The device of claim 7 wherein a generally transverse head bore is formed in said head for connecting the seal and the exterior of said head, and wires positioned in said head bore electrically connecting said explosive charge to said sensing means.

11. An instrument panel safety device and valve head combination for use in a motor vehicle having a collision sensing means for sensing a collision operably mounted on the vehicle, the device comprising:

a hollow cylinder having a top end and a bottom end, said top end adapted to be connected to said instrument panel;

a piston residing within said cylinder, said hollow cylinder being axially slidable on the piston between an extended position and a collapsed position, an elongated rod with one end secured to said piston and its other end connected to said vehicle such that the piston and the rod are substantially immovable relative to said cylinder;

a cap secured to said bottom end of said hollow cylinder, said cap having a bore extending therethrough for receiving the rod such that the cylinder moves freely between said extended position and said collapsed position;

sealing means for sealing the hollow cylinder in order to define an air-tight cavity within the hollow cylinder, the air-tight cavity containing prior to collision pressurized gas, said sealing means further comprising a head, an axial bore extending through the head, and a seal in the bore, wherein the head is secured to the top end of said hollow cylinder, said seal further comprises a frangible body having a pair of opposite sides and a circumferential wall connecting said sides, a transverse bore for containing an explosive charge formed in the wall; and opening means to rapidly open the sealing means in response to a signal generated by the collision sensing means, thereby permitting movement of the hollow cylinder from the extended position to the collapsed position.

12. The device of claim 11 wherein an air bag for capturing said pressurized gas released from said cavity is positioned within said instrument panel.

13. The device of claim 11 further comprising biasing means inside said cylinder for biasing said piston and said cap apart.

14. The device of claim 11 wherein a generally transverse head bore is formed in said head for connecting the seal and the exterior of said head, and wires positioned in said head bore electrically connecting said explosive charge to said sensing means.

15. The device of claim 13 wherein an air bag for capturing said pressurized gas released from said cavity is positioned within said instrument panel.

16. The device of claim 14 wherein an air bag for capturing said pressurized gas released from said cavity is positioned within said instrument panel.

17. The device of claim 15 further comprising damping means connected to the instrument panel for damping force placed on said instrument panel by an occupant upon collision.

18. The device of claim 16 further comprising damping means connected to said instrument panel for damping force placed on said instrument panel by an occupant upon collision.

19. An instrument panel safety device and valve head combination for use in a motor vehicle having an instrument panel and a collision sensing means operably mounted on the vehicle and for sensing a collision, the device comprising:

a hollow cylinder having a top end and a bottom end, the top end configured for connection to an instrument panel of a vehicle;

a piston residing within said cylinder, said cylinder being axially slidable on the piston between an extended position and a collapsed position;

an elongated rod with first and second ends, the first end being secured to said piston and the second end being fixedly connected to the vehicle;

sealing means for sealing the hollow cylinder in order to define an air-tight cavity within the hollow cylinder, the air-tight cavity containing prior to collision pressurized gas; and, opening means to rapidly open the sealing means in response to a signal generated by the collision sensing means, thereby permitting movement of the hollow cylinder from the extended position to the collapsed position.

* * * * *